(12) United States Patent
Loffink

(10) Patent No.: US 8,694,709 B2
(45) Date of Patent: Apr. 8, 2014

(54) SYSTEMS AND METHODS FOR IMPROVING CONNECTIONS TO AN INFORMATION HANDLING SYSTEM

(75) Inventor: John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 12/767,594

(22) Filed: Apr. 26, 2010

(65) Prior Publication Data

US 2011/0264840 A1 Oct. 27, 2011

(51) Int. Cl.
*G06F 13/36* (2006.01)
*G06F 1/20* (2006.01)
*H01R 24/00* (2011.01)
*H05K 1/11* (2006.01)

(52) U.S. Cl.
USPC ....... 710/315; 439/660; 361/679.33; 361/790

(58) Field of Classification Search
USPC .............................. 710/315; 439/660; 361/790
See application file for complete search history.

(56) References Cited

U.S. PATENT DOCUMENTS

| | | | |
|---|---|---|---|
| 6,386,920 B1 * | 5/2002 | Sun | 439/630 |
| 6,574,115 B2 * | 6/2003 | Asano et al. | 361/775 |
| 6,983,338 B2 | 1/2006 | Hadba et al. | |
| 6,996,642 B2 * | 2/2006 | Apperley et al. | 710/74 |
| 7,325,086 B2 * | 1/2008 | Kong et al. | 710/307 |
| 7,371,116 B2 * | 5/2008 | Chiang | 439/607.34 |
| 7,632,139 B2 * | 12/2009 | Chou et al. | 439/541.5 |
| 7,743,187 B2 * | 6/2010 | Choi et al. | 710/64 |
| 7,850,490 B2 * | 12/2010 | Hunkins | 439/638 |
| 7,865,629 B1 * | 1/2011 | Tantos et al. | 710/11 |
| 7,917,682 B2 * | 3/2011 | Bakthavathsalam | 710/315 |
| 7,934,032 B1 * | 4/2011 | Sardella et al. | 710/104 |
| 8,007,289 B2 * | 8/2011 | Bandhu et al. | 439/79 |
| 2004/0062002 A1 * | 4/2004 | Barringer et al. | 361/687 |
| 2005/0160212 A1 * | 7/2005 | Caruk | 710/301 |
| 2006/0294272 A1 * | 12/2006 | Chou et al. | 710/62 |
| 2006/0294279 A1 * | 12/2006 | McKee et al. | 710/301 |
| 2007/0066128 A1 * | 3/2007 | Wu et al. | 439/499 |
| 2007/0081315 A1 * | 4/2007 | Mondor et al. | 361/788 |
| 2007/0094472 A1 * | 4/2007 | Marks et al. | 711/170 |
| 2007/0139423 A1 * | 6/2007 | Kong et al. | 345/502 |
| 2008/0059795 A1 * | 3/2008 | Vogel | 713/165 |

(Continued)

OTHER PUBLICATIONS

Alvin Cox, External connector pin assignment change T10/03-315r0, Sep. 9, 2003.*

(Continued)

*Primary Examiner* — Paul R Myers
*Assistant Examiner* — Christopher A Daley
(74) *Attorney, Agent, or Firm* — Baker Botts L.L.P.

(57) ABSTRACT

System and methods for improving connections to an information handling system are disclosed. An enhanced serial attached small computer system interface for an information handling system includes a receptacle which is connectable to an information handling system and a connector which is connectable to the receptacle. The connector comprises a first set of signal pins positioned on a first planar surface of the connector and a second set of signal pins positioned on a second planar surface of the connector. The second planar surface is not co-planar with the first planar surface. The connector further includes a third set of signal pins positioned on a third planar surface of the connector and the third planar surface is not co-planar with the first planar surface and the second planar surface.

17 Claims, 10 Drawing Sheets

(56) References Cited

U.S. PATENT DOCUMENTS

| | | | |
|---|---|---|---|
| 2008/0313381 A1* | 12/2008 | Leigh et al. | 710/313 |
| 2009/0042411 A1* | 2/2009 | Chou et al. | 439/65 |
| 2009/0157938 A1* | 6/2009 | Hunkins et al. | 710/306 |
| 2010/0122011 A1* | 5/2010 | Arimilli et al. | 710/316 |
| 2010/0216340 A1* | 8/2010 | Lin et al. | 439/607.01 |
| 2011/0078345 A1* | 3/2011 | Lee et al. | 710/62 |

OTHER PUBLICATIONS

Pinout.ru, PCI Express 1x, 4x, 8x, 16x bus pinout, 2009.*

Elliot, Information Technology—Serial Attached SCSI—1.1 (SAS-1.1), Sep. 21, 2005, pp. 93-135, http://arc.opensolaris.org/caselog/FWARC/2008/013/commitment2.materials/specifications/sas1r10.pdf.

* cited by examiner

| Segment | Pin No. | Pin Name |
|---|---|---|
| Signal Segment | S1 | GND |
| | S2 | Lane 1 transmit |
| | S3 | |
| | S4 | GND |
| | S5 | Lane 1 receive |
| | S6 | |
| | S7 | GND |
| Backside Signal Segment | S8 | GND |
| | S9 | Lane 2 transmit |
| | S10 | |
| | S11 | GND |
| | S12 | Lane 2 receive |
| | S13 | |
| | S14 | GND |
| Power Segment | P1 | 3.3V |
| | P2 | 3.3V |
| | P3 | 3.3V |
| | P4 | GND |
| | P5 | GND |
| | P6 | GND |
| | P7 | 5V |
| | P8 | 5V |
| | P9 | 5V |
| | P10 | GND |
| | P11 | Reserved |
| | P12 | GND |
| | P13 | 12V |
| | P14 | 12V |
| | P15 | 12V |

*FIG. 4*

| Segment | Pin No. | Pin Name | Segment | Pin No. | Pin Name |
|---|---|---|---|---|---|
| Signal Segment | S1 | GND | Power Segment | P1 | 3.3V |
| | S2 | Lane 1 transmit | | P2 | 3.3V |
| | S3 | | | P3 | 3.3V |
| | S4 | GND | | P4 | GND |
| | S5 | Lane 1 receive | | P5 | GND |
| | S6 | | | P6 | GND |
| | S7 | GND | | P7 | 5V |
| | S45 | GND | | P8 | 5V |
| | S46 | 1/2 Lane | | P9 | 5V |
| | S47 | | | P10 | GND |
| | S48 | GND | | P11 | Reserved |
| | S8 | GND | | P12 | GND |
| | S9 | Lane 2 transmit | | P13 | 12V |
| | S10 | | | P14 | 12V |
| | S11 | GND | | P15 | 12V |
| | S12 | Lane 2 receive | | | |
| | S13 | | | | |
| | S14 | GND | | | |
| | S15 | Lane 3 transmit | | | |
| | S16 | | | | |
| | S17 | GND | | | |
| | S18 | Lane 3 receive | | | |
| | S19 | | | | |
| | S20 | GND | | | |
| | S21 | Lane 4 transmit | | | |
| | S22 | | | | |
| | S23 | GND | | | |
| | S24 | Lane 4 receive | | | |
| | S25 | | | | |
| | S26 | GND | | | |
| | S27 | Lane 5 transmit | | | |
| | S28 | | | | |
| | S29 | GND | | | |
| | S30 | Lane 5 receive | | | |
| | S31 | | | | |
| | S32 | GND | | | |
| | S33 | Lane 6 transmit | | | |
| | S34 | | | | |
| | S35 | GND | | | |
| | S36 | GND | | | |
| | S37 | Lane 6 receive | | | |
| | S38 | | | | |
| | S39 | GND | | | |
| | S40 | Lane 7 transmit | | | |
| | S41 | | | | |
| | S42 | GND | | | |
| Backside Signal Segment | S43 | Lane 7 receive | | | |
| | S44 | | | | |

FIG. 7

SYSTEMS AND METHODS FOR IMPROVING CONNECTIONS TO AN INFORMATION HANDLING SYSTEM

TECHNICAL FIELD

The present disclosure relates generally to information handling systems and, more particularly, to system and methods for improving connections to an information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Flash memory is a non-volatile data storage device that can be electronically erased and reprogrammed. The performance of an information handling system, such as a server, may be improved by using flash memory which provides bulk storage and/or high speed caching. A Flash Solid-State Drive ("SSD") is a type of flash memory that uses solid-state memory to store persistent data. An SSD emulates a hard disk drive interface and may replace it in many applications.

Small Computer System Interface ("SCSI") is a set of standards for physically connecting and transferring data between information handling systems and peripheral devices such as data storage devices. Serial Attached SCSI ("SAS") is an evolution of the traditional SCSI into a point-to-point serial peripheral interface in which controllers are linked directly to disk drives. SAS provides an improvement over the traditional SCSI because it enables multiple devices of different sizes and types to be connected simultaneously with thinner and longer cables. In addition, SAS drives can be hot-plugged. Specifically, SAS drives may be connected to or removed from an information handling system while the information handling system is running and the operating system of the information handling system can recognize that change.

Advanced Technology Attachment ("ATA") is another disk drive implementation for an information handling system that integrates the controller on the disk drive itself. Serial ATA ("SATA") is an evolution of the traditional ATA and is a serial link, typically consisting of a single cable with a minimum of four wires. The SATA creates a point-to-point connection between devices. The thin SATA cables facilitate more efficient air flow inside a form factor and also allow for smaller chassis designs. The term "form factor" refers to the physical shape and size of a device and may be used to describe the size of a circuit board.

Typically, the capabilities of SAS and SATA Flash SSDs may be limited by the interface. Specifically, the single or dual SATA or SAS lanes to the end data storage device may adversely impact system operations by causing latency and limiting throughput. Similarly, Flash Solid State Cards or Peripheral Component Interconnect Express ("PCIe") Flash cards are limited by the confines of its form factor which supports hot plug but not in a manner acceptable to system users.

Hot plug in a data center environment is preferably achieved through front or back loading modules. The current high performance storage form factor is the 2.5 inch hard disk drive. It is desirable to put PCIe SSDs in this form factor for system design and customer usage. However, from a system design perspective, co-locating two different connectors is challenging due to the need for front to back airflow in data center hardware. Specifically, two physical connectors, one for SAS devices and one for PCIe devices, block any opportunity for cooling vent holes in the storage device backplanes.

SUMMARY

The present disclosure relates generally to information handling systems and, more particularly, to system and methods for improving connections to an information handling system.

In one exemplary embodiment, the present invention is directed to an enhanced serial attached small computer system interface for an information handling system comprising: a receptacle; wherein the receptacle is connectable to an information handling system; and a connector; wherein the connector is connectable to the receptacle; and wherein the connector comprises: a first set of signal pins positioned on a first planar surface of the connector; a second set of signal pins positioned on a second planar surface of the connector; wherein the second planar surface is not co-planar with the first planar surface; and a third set of signal pins positioned on a third planar surface of the connector; wherein the third planar surface is not co-planar with the first planar surface and the second planar surface.

In another exemplary embodiment, the present invention is directed to a method of selectively transferring data over a PCIe path or a SAS path comprising: connecting an enhanced connector with a first set of connection lanes and a second set of connection lanes to one or more controllers; wherein the controller controls the connection lanes; wherein the first set of connection lanes are operable as a PCIe signal path; wherein the second set of connection lanes are operable as a SAS signal path; connecting the first set of connection lanes to a PCIe data storage device; and connecting the second set of connection lanes to a SAS data storage device.

In another exemplary embodiment, the present invention is directed to a method of selectively transferring data over a PCIe path or a SAS path comprising: connecting an enhanced connector with a first set of connection lanes and a second set of connection lanes connected to one or more controllers; wherein the one or more controllers control the connection lanes; wherein the first set of connection lanes are operable as a PCIe signal path; wherein the second set of connection lanes are optionally operable as a SAS signal path or a PCIe signal path; connecting the first set of connection lanes to a PCIe data storage device; and connecting the second set of connection lanes to a data storage device selected from the group consisting of a SAS data storage device and a PCIe data storage device.

Thus, the present disclosure provides apparatuses and methods for improving connections to an information handling system. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a chart of the pin count for a SAS connector in accordance with the prior art.

FIG. 7 is a chart of the pin count for a SAS connector in accordance with the present invention.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
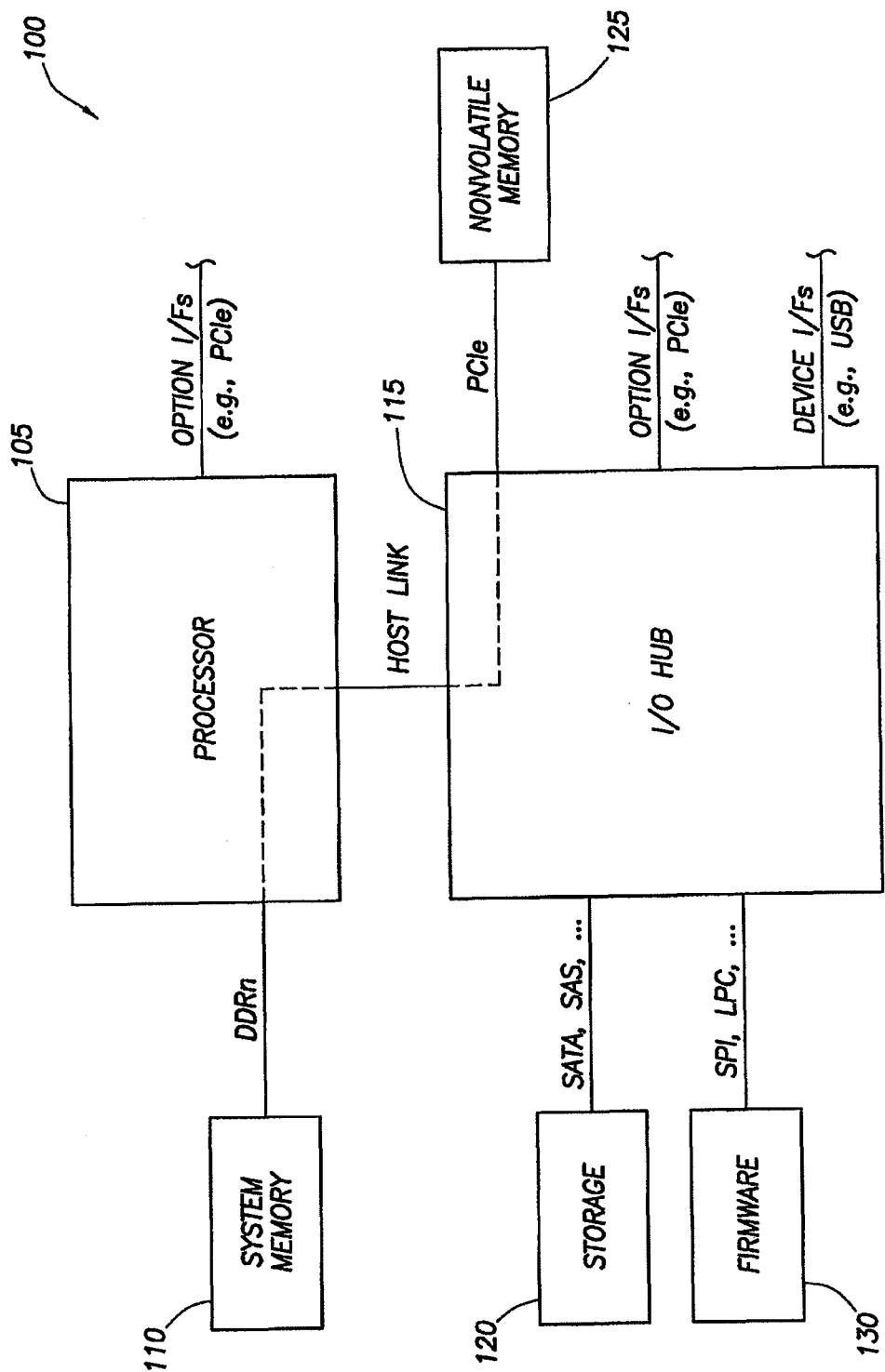
FIG. 1 is a block diagram showing an information handling system in accordance with certain embodiments of the present disclosure.

FIG. 1 illustrates a block diagram of an example information handling system 100, in accordance with certain embodiments of the present disclosure. In certain embodiments, information handling system 100 may be a personal computer (e.g., a desktop computer, workstation or portable computer), storage enclosure or server. As depicted in FIG. 1, information handling system 100 may include a processor 105, a system memory 110 communicatively coupled to processor 105, an I/O hub 115 communicatively coupled to processor 105, storage 120 communicatively coupled to I/O hub 115, nonvolatile memory 125 communicatively coupled to I/O hub 115, and firmware 130 communicatively coupled to I/O hub 115.

Processor 105 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 105 may interpret and/or execute program instructions and/or process data stored in system memory 110, storage media 120 and/or another component of information handling system 100. Processor 105 may be coupled to other components (not shown) with optional interfaces (I/Fs) via a PCIe interface, for example.

System memory 110 may be communicatively coupled to processor 105, for example, via a DDRn (a version of a double-date-rate type) interface. System memory 110 may include any system, device, or apparatus configured to retain program instructions and/or data for a period of time (e.g., computer-readable media). System memory 110 may include random access memory (RAM), electrically erasable programmable read-only memory (EEPROM), a PCMCIA card, flash memory, magnetic storage, opto-magnetic storage, or any suitable selection and/or array of volatile memory. Note that apparatuses and methods described may apply to the volatile portions of system memory 110.

Processor 105 may be coupled to an I/O hub 115 via a host link, for example. I/O hub 115 may be communicatively coupled to storage 120 via, for example, a SCSI, Internet SCSI (iSCSI), SAS or any other transport that operates with the SCSI protocol, ATA, SATA, advanced technology attachment packet interface (ATAPI), serial storage architecture (SSA), integrated drive electronics (IDE), and/or any combination thereof. Storage 120 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

I/O hub 115 may be communicatively coupled to firmware 130 via any suitable interface such as SPI (System Packet Interface), LPC (Low Pin Count) interface, for example. The information handling system 100 may include one or more components that process and/or operate based on firmware embedded in or coupled to the component. For example, such components may include hard disk drives (HDDs), CD-ROM drives, and DVD drives, and/or various other devices and the like that include controllers driven by firmware. Firmware may be the program code embedded in a storage device and maintained within or coupled to the device. The firmware for a component most often comprises the operational code for the component.

More generally, firmware may include program code operable to control a plurality of information handling system 100 operations. System memory 110, for example, may store firmware such as a basic input/output system (BIOS) program, and/or device drivers such as network interface card (NIC) drivers. A device driver may include program code operable to facilitate interaction of a hardware device with other aspects of information handling system 100. A BIOS program may include software that facilitates interaction with and between the information handling system 100 devices such as a keyboard, a mouse, and/or one or more I/O devices. Information handling system 100 may operate by executing BIOS for a system firmware in response to being powered up or reset. BIOS may identify and initialize components of system 100 and cause an operating system to be booted.

I/O hub 115 may be communicatively coupled to nonvolatile memory 125 via a PCIe interface, for example. Nonvolatile memory 125 may include, for example, fast nonvolatile memory such as flash memory, NVDIMMs (nonvolatile dual in-line memory modules), a PCIe (Peripheral Component Interconnect Express) add-in-card, a direct connect nonvolatile interface (e.g., an ONFI (Open NAND Flash Interface Working Group) interface), a SSD (solid-state drive), or another storage type configured for fast restart. I/O hub 115 may be coupled to other components (not shown) with optional interfaces (I/Fs) such as a PCIe interface and device interfaces (I/Fs) such as a USB (Universal Serial Bus) interface, for example.

Figure 2A:
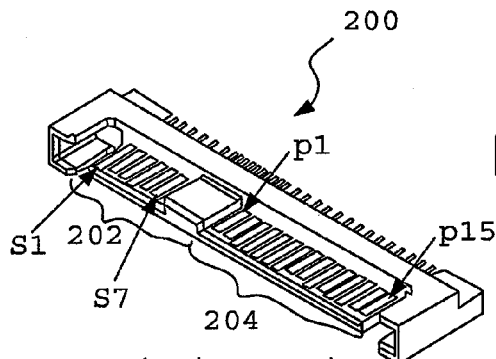
FIG. 2 is a perspective view of a SAS drive plug connector ("SAS Connector") in accordance with the prior art.
Figure 2B:
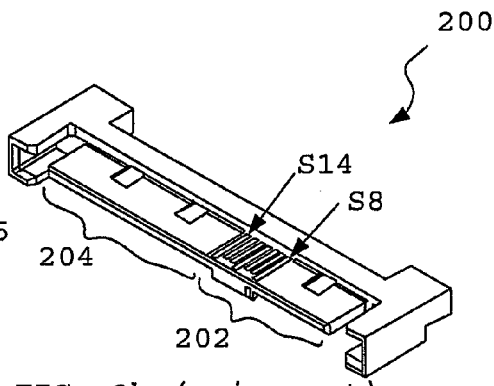
Figure 3:
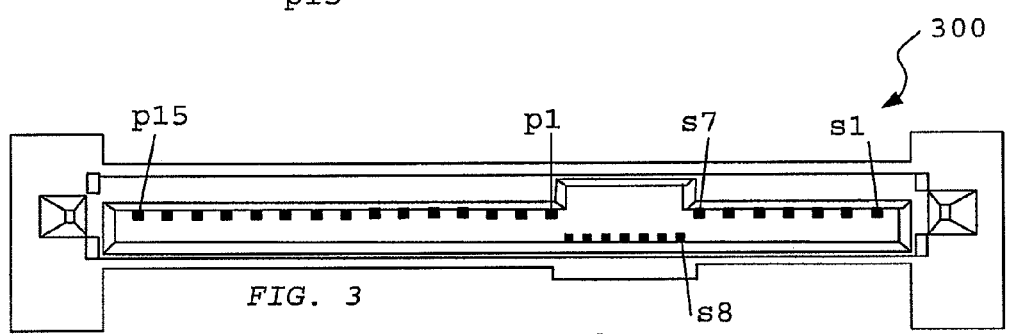
FIG. 3 is a side view of a receptacle of the SAS Connector of FIG. 2.

Turning now to FIG. 2, a SAS drive plug connector ("SAS Connector") in accordance with the prior art is denoted generally with reference numeral 200. As depicted in FIG. 2, the SAS drive plug 200 includes a signal segment 202 and a power segment 204. FIG. 2a is a top view of the SAS connector 200 and FIG. 2b is the bottom of the SAS connector 200. The SAS connector 200 includes a signal segment 202 including pins S1-S7 and S8-S14 as well as a power segment 204 with pins P1-P15. FIG. 3 depicts the corresponding backplane receptacle connector for the SAS Connector 200, denoted generally with reference numeral 300.

FIG. 4 depicts the pin count for a SAS connector in accordance with the prior art. As shown in FIG. 4, a typical SAS connector in accordance with the prior art provides 2 differential lanes for data transfer.

Figure 5A:
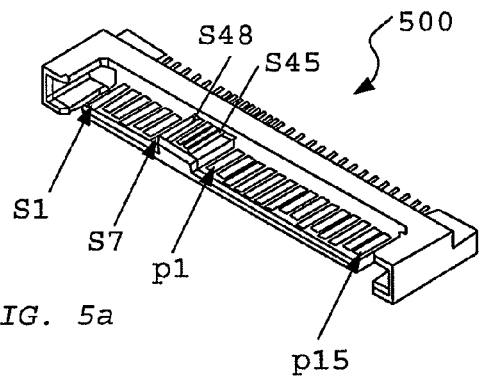
FIG. 5 is a perspective view of a SAS drive plug connector ("SAS Connector") in accordance with an embodiment of the present invention.
Figure 5B:
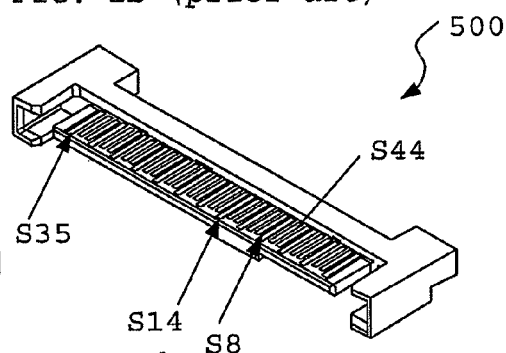
Figure 6:
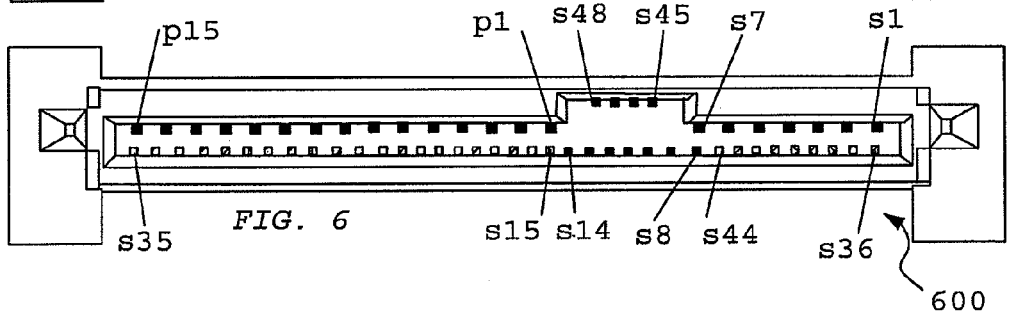
FIG. 6 is a side view of a receptacle of the SAS Connector of FIG. 5.

FIG. 5 is an enhanced SAS Connector denoted generally with reference numeral 500. FIG. 5a is a top view of the enhanced SAS Connector 500 and FIG. 5b is a bottom view. As depicted in FIG. 5, the enhanced SAS Connector 500 includes additional signal pins S15-S48, using the same width signals and ground pin pattern as pins S8-S14. FIG. 6 shows the corresponding backplane receptacle connector for the enhanced SAS Connector 500, denoted generally with reference numeral 600.

Specifically, FIG. 7 shows the pin count of the enhanced SAS connector 500 in accordance with an embodiment of the present invention. As shown in FIG. 5-7, the enhanced SAS connector provides 5 and ½ additional differential lanes, or 7 and ½ total lanes for data transmission. As would be appreciated by those of ordinary skill in the art, with the benefit of this disclosure, slightly finer contacts may be used to allow the connector 500 to support 6 additional data transmission lanes, or a total of 8 lanes.

As would be apparent to those of ordinary skill in the art, although not shown in FIG. 5, the back end of the enhanced SAS connector 500 would also be modified to provide two layers of pins contacting the Printed Circuit Board ("PCB"). Contact patterns can be modified with less of the longer ground contact, providing additional signal count when only single ended signals are needed. As would be appreciated by those of ordinary skill in the art, with the benefit of this disclosure, other patterns may include dual ground isolation contacts for higher speed signaling above 10 Gbps.

The system and methods disclosed herein may be used to support multiplexed or discrete signal operations at the controller end. A first mode of operation for the enhanced SAS connector 500 of the present invention is depicted in FIG. 8. In this mode of operation, the signal lanes are entirely separate between fabrics and the SAS and PCIe are discrete signals at the connector. In this embodiment, 6 data transmission lanes of the enhanced SAS connector 500 may be utilized. In one embodiment, signal lane 1 502 and signal lane 2 504 which may be provided by signals 51 through S14, would provide the two SAS signal lanes. The signal lanes 3 505, 4 508, 5 510 and lane 6 512 may be provided by signals S15 through S48 as shown in FIG. 7.

Figure 8A:
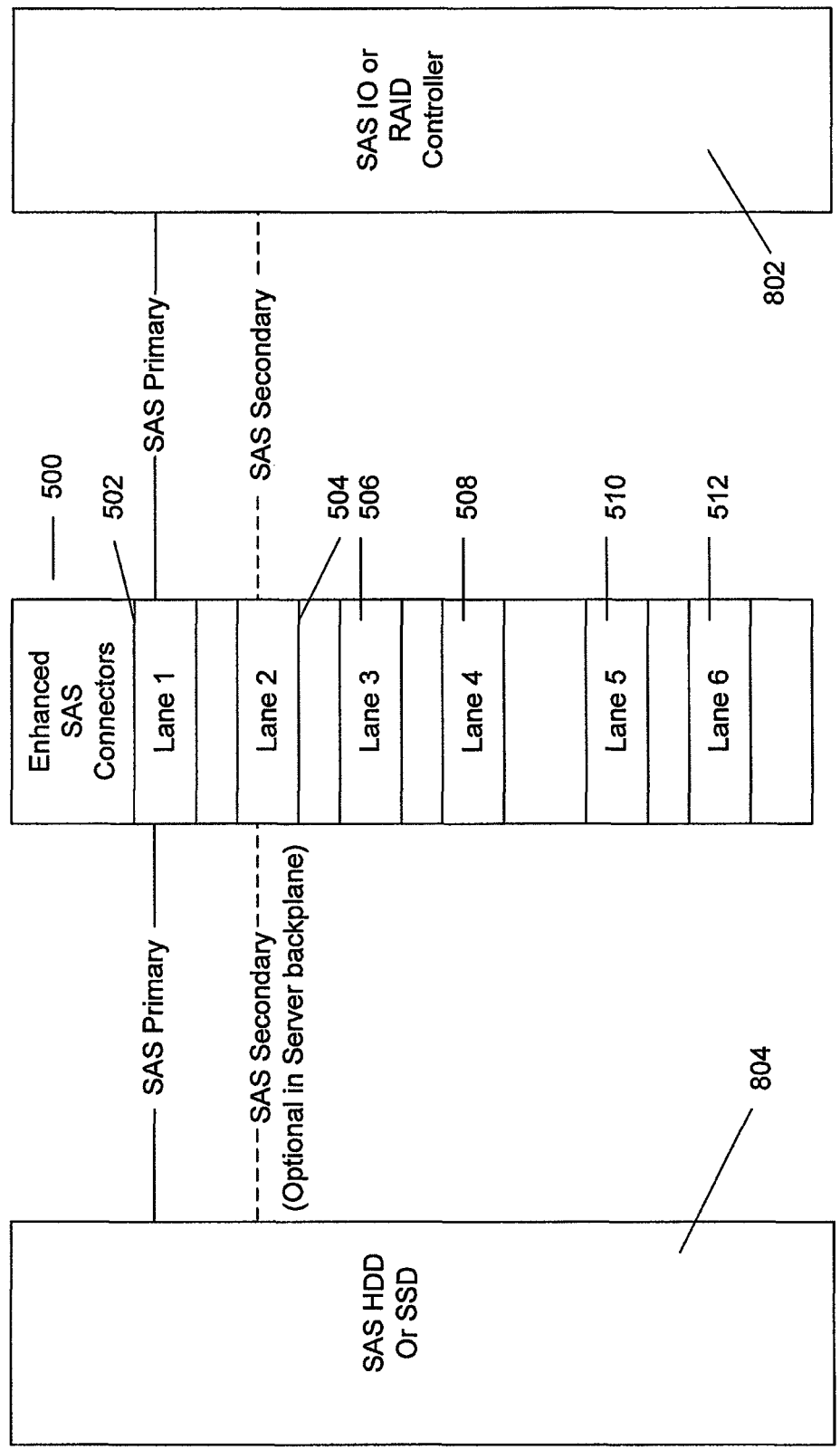
FIG. 8 depicts the operation of a SAS drive plug connector in accordance with one exemplary embodiment of the present invention.
Figure 8B:
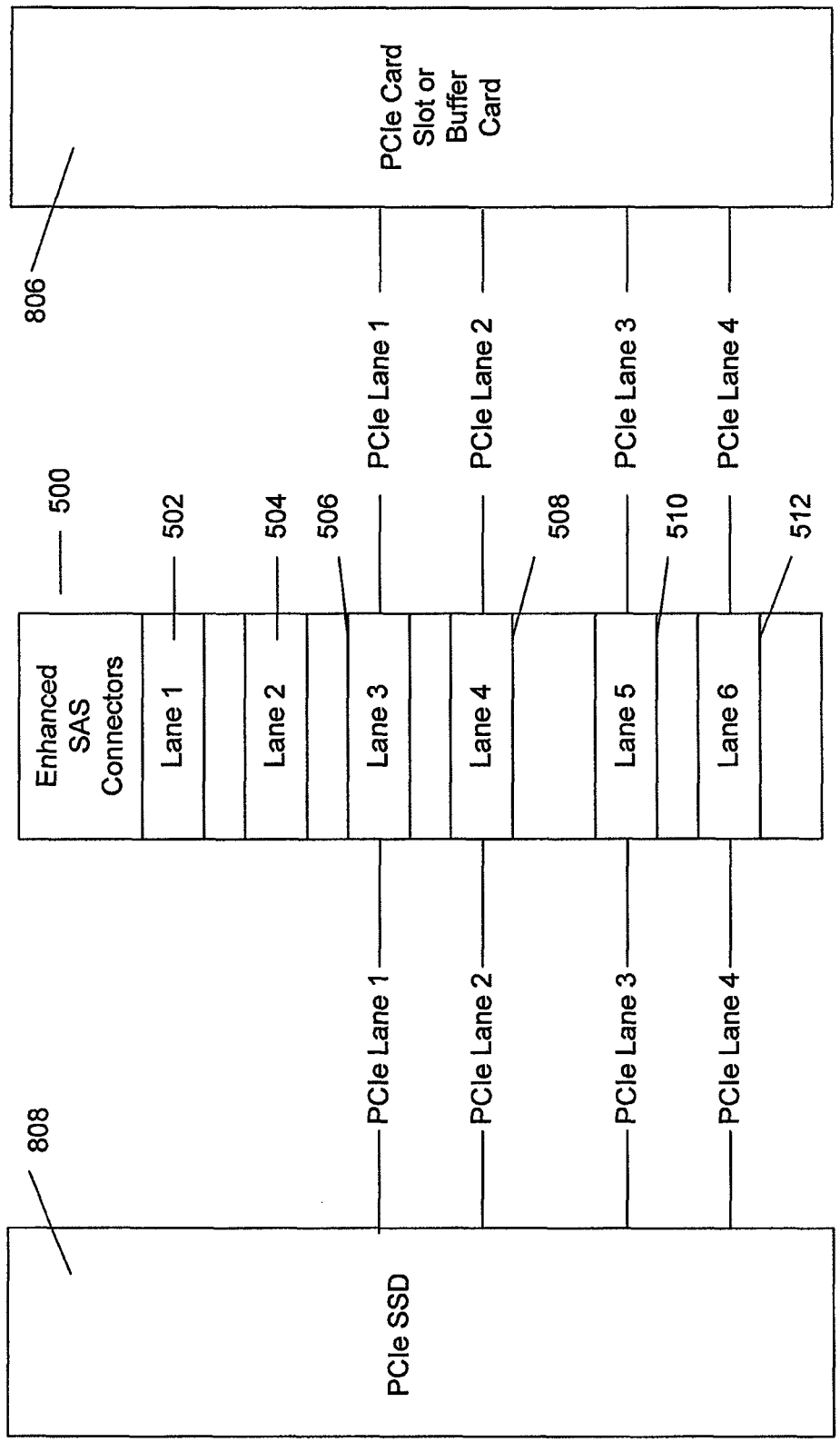
Figure 8C:
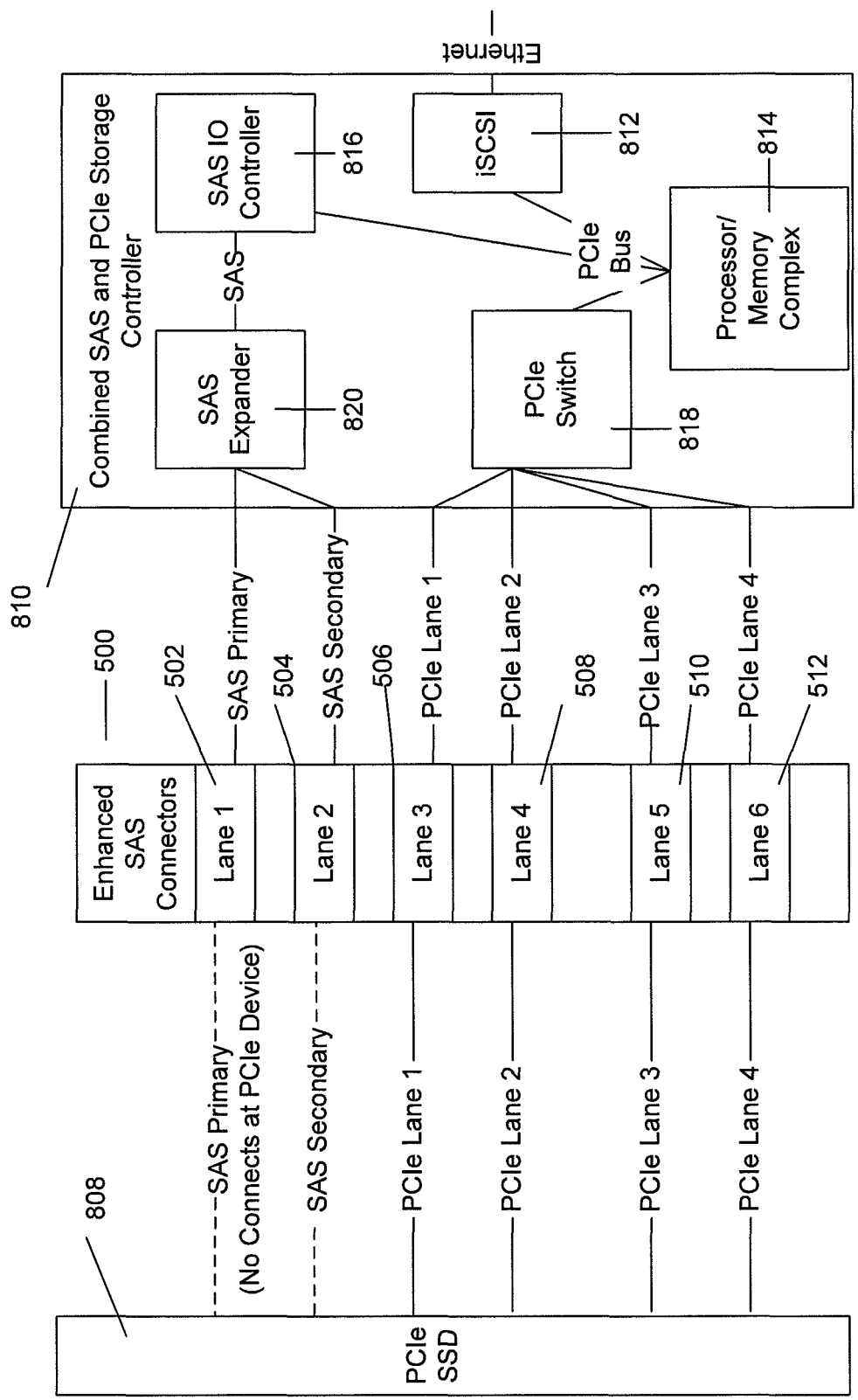

FIG. 8a shows a SAS Input/Output Controller or SAS Redundant Array of Independent Disks ("RAID") Controller 802 connected to a SAS HDD or SAS SSD 804 through lane 1 502 and lane 2 504 of the enhanced SAS connector 500. Similarly, FIG. 8b shows a PCIe Card Slot or a PCIe Buffer Card 808 connected to a PCIe SSD 806 through lanes 3-6 of the enhanced SAS connector 500. FIG. 8c shows an exemplary embodiment with the PCIe SSD 808 connected to a combined SAS and PCIe Storage Controller ("controller") 810 through the enhanced SAS connector 5. As would be apparent to those of ordinary skill in the art, with the benefit of this disclosure, item 808 may alternatively be a SAS/SATA SSD or HHD.

In one embodiment, the controller 810 may be connected to a network, such as, for example, the Ethernet, through an Internet Small Computer System Interface ("iSCSI") 812 or another suitable interface. The iSCSI 812 may be communicatively coupled to the processor or memory complex 814 of the controller 810. The processor 814 may control the SAS IO controller 816 and the PCIe Switch 818. The SAS IO Controller 816 may be connected to a SAS Expander 820 which can expand the SAS signals onto two separate lanes—i.e. lane 1 502 and lane 2 504. Similarly, the PCIe Switch 818 may transmit signals through PCIe lane 1 (lane 3) 506, PCIe Lane 2 (lane 4) 508, PCIe Lane 3 (lane 5) 510 and PCIe Lane 4 (lane 6) 512. The signals from lane 1 502 and lane 2 504 may then be transmitted to a SAS device (not shown) while the signals from lane 3 506, lane 4 508, lane 5 510 and lane 6 512 may be transmitted to the PCIe SSD 808. Accordingly, two paths for SAS provide compatibility with existing SAS and SATA drives while four additional paths for PCIe or another fabric provide forwards compatibility with a new fabric.

In another exemplary embodiment, the signal lanes of the enhanced SAS connector 500 may be multiplexed. In this embodiment, signal lanes may be shared between the new fabric (Signals S15-S48) and the traditional SAS lanes (S1-S14), for 4 to 8 lane fabric width. For instance, as shown in FIG. 9c, four lanes may be utilized to transmit two SAS signals and four PCIe signals. In this embodiment, the signals may be multiplexed at the controller end, or there may be two different controllers that are physically swapped out.

Figure 9A:
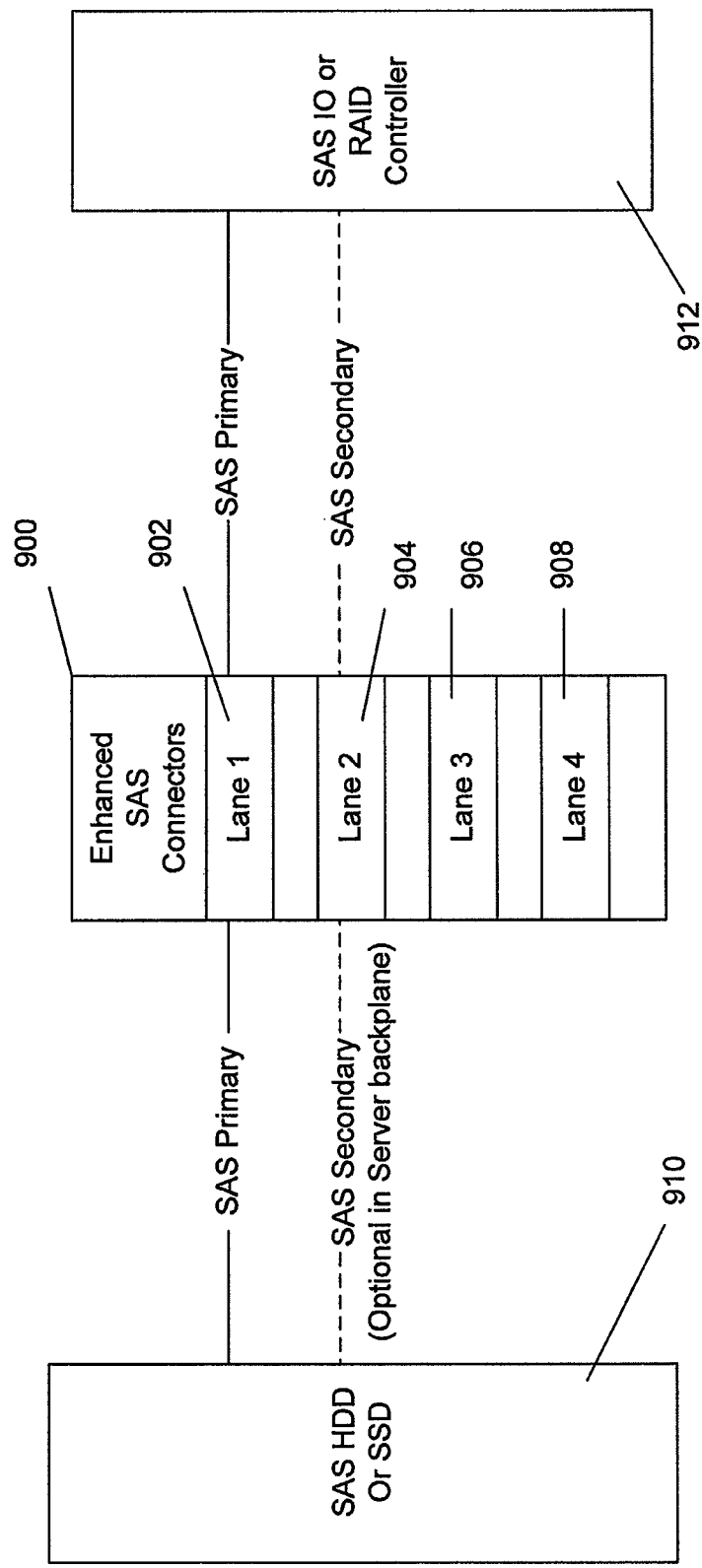
FIG. 9 depicts the operation of a SAS drive plug connector in accordance with another exemplary embodiment of the present invention.
Figure 9B:
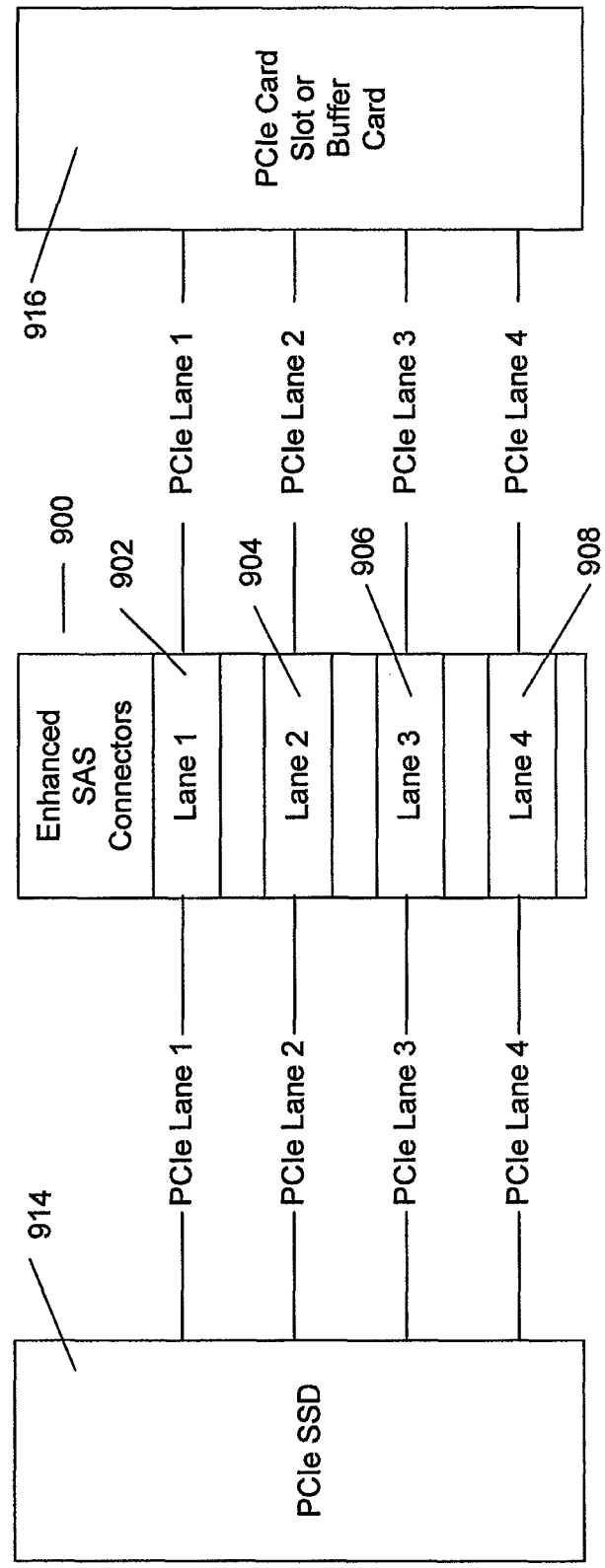
Figure 9C:
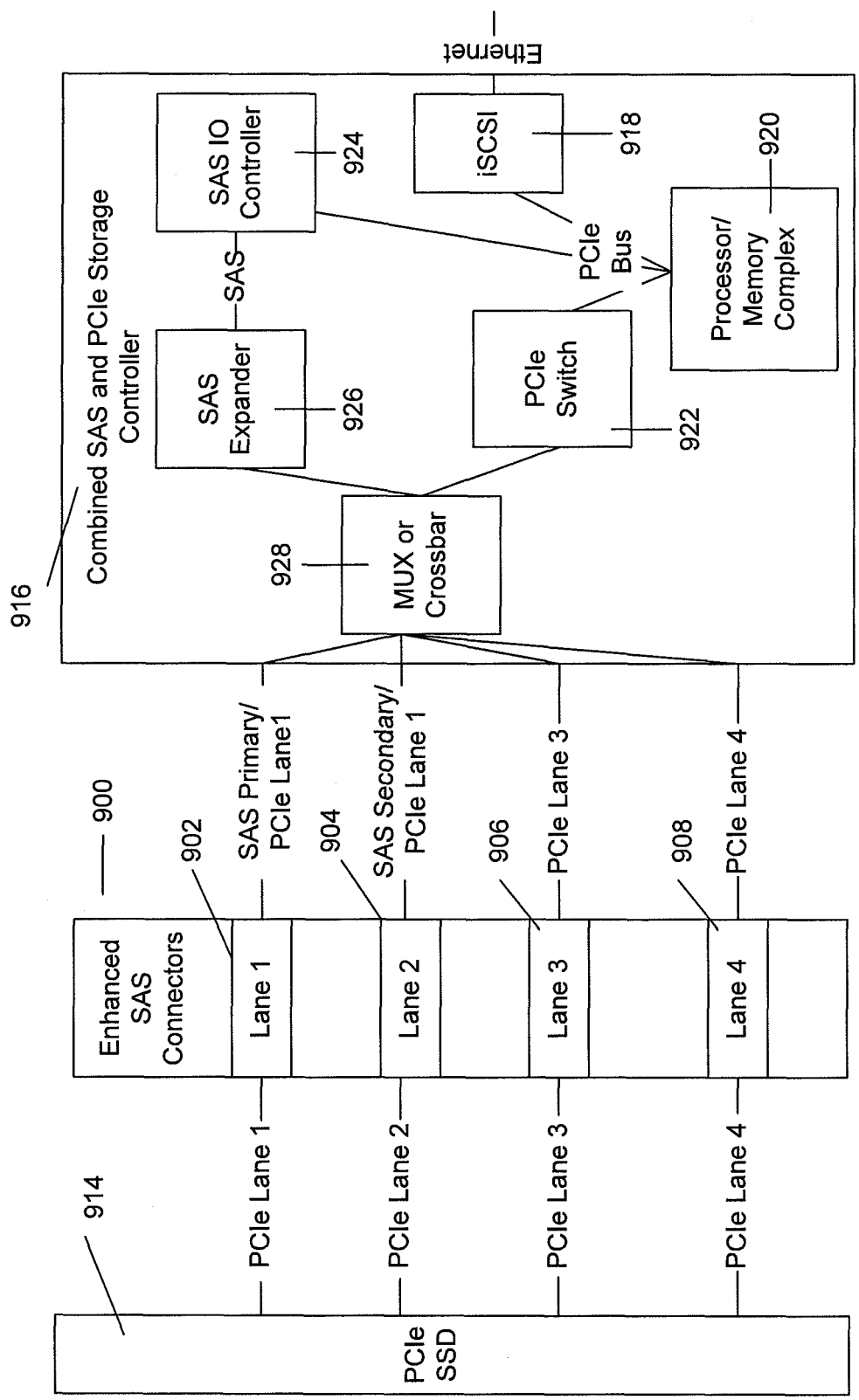

As shown in FIG. 9a, lane 1 902 and lane 2 904 of the enhanced SAS connector 900 may be used to connect a SAS HDD or SAS SSD 910 to a SAS IO Controller or SAS RAID Controller 912. Similarly, lane 1 902, lane 2 904, lane 3 906 and lane 4 908 may connect the PCIe SSD 914 to a PCIe Card Slot or Buffer Card 916. As shown in FIG. 9c, in another embodiment, the PCIe SSD 914 may be connected to a combined SAS and PCIe Storage Controller ("controller") 916. As would be apparent to those of ordinary skill in the art, with the benefit of this disclosure, item 914 may alternatively be a SAS/SATA SSD or HHD.

In one embodiment, the controller 916 may be connected to a network, such as, for example, the Ethernet, through an iSCSI 918 or another suitable interface. The iSCSI 918 may be communicatively coupled to the processor or memory complex 920 of the controller 916. The processor 920 may be communicatively coupled to a PCIe Switch 922 and a SAS JO Controller 924. The SAS IO Controller 924 may in turn be communicatively coupled to a SAS Expander 926. Each of the PCIe Switch 922 and the SAS Expander 926 may be connected to a multiplexer 928. The multiplexer 928 selects which of the SAS signal from the SAS expander 926 and the PCIe signal from the PCIe switch 922 will be directed to each lane of the enhanced SAS connector 900. Accordingly, in the exemplary embodiment, lane 1 902 and lane 2 904 may be operable to transmit both SAS and PCIe data while lane 3 906 and lane 4 908 transmit only PCIe data.

A discovery process is required at the PCIe controller or device to insure a SAS device or controller plugged into the system does not get driven by PCIe signals. Once the discovery process is completed, the controller may use all lanes, including the traditional SAS lanes, S1 through S14.

As would be appreciated by those of ordinary skill in the art, with the benefit of this disclosure, variations on the end storage devices and source controller devices are possible, including division of the end device ports into dual ×4 lanes for high availability.

Accordingly, signal lanes are added to the backside of the SAS/SATA device connectors, in support of protocols with greater widths than ×2 supported by SAS. In one embodiment, a PCIe device in a 2.5 inch form factor may be placed in the same or a similar slot to a 2.5 inch SATA or SAS drive.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. An enhanced serial attached small computer system interface for an information handling system comprising:
   a receptacle;
      wherein the receptacle is connectable to an information handling system;
   a single connector;
      wherein the single connector is one of a SAS connector or a SATA connector;
      wherein the single connector is connectable to the receptacle; and
      wherein the single connector comprises:
         a first set of signal pins positioned on a first planar surface of the single connector;
         a second set of signal pins positioned on a second planar surface of the single connector;
         wherein the second planar surface is not co-planar with the first planar surface; and
         a third set of signal pins positioned on a third planar surface of the single connector;
         wherein the third planar surface is not co-planar with the first planar surface and the second planar surface; and
   two or more signal lanes, wherein the two or more signal lanes are provided by signals associated with at least one of the first set of signal pins, the second set of signal pins or the third set of signal pins of the single connector and wherein a discovery process ensures the signals are of a proper type.

2. The enhanced serial attached small computer system interface of claim 1, further comprising a set of power pins, wherein the set of power pins are positioned on the first planar surface of the single connector.

3. The enhanced serial attached small computer system interface of claim 2, wherein the set of power pins comprises fifteen pins.

4. The enhanced serial attached small computer system interface of claim 1, wherein the first set of signal pins comprises seven pins.

5. The enhanced serial attached small computer system interface of claim 1, wherein the second set of signal pins comprises thirty seven pins.

6. The enhanced serial attached small computer system interface of claim 1, wherein the third set of signal pins comprises four pins.

7. The enhanced serial attached small computer system interface of claim 1, wherein the first set of signal pins, the second set of signal pins and the set of power pins are located on a first side of the enhanced serial attached small computer system interface; and wherein the third set of signal pins is located on a second side of the enhanced serial attached small computer system interface.

8. The enhanced serial attached small computer system interface of claim 1, wherein the first set of signal pins, the second set of signal pins and the third set of signal pins provide at least seven differential lanes for data transfer.

9. A method of selectively transferring data over a PCIe path or a SAS path comprising:
   connecting an enhanced single connector having a first set of connection lanes and a second set of connection lanes to one or more controllers, wherein the first set of connection lanes and the second set of connection lanes are provided by signals associated with at least one of a first set of signal pins, a second set of signal pins or a third set of signal pins of the enhanced single connector;
   wherein the enhanced single connector is one of a SAS connector or a SATA connector;
   wherein the controller controls the connection lanes;
   wherein the first set of connection lanes are operable as a PCIe signal path;
   wherein the second set of connection lanes are operable as a SAS signal path;
   connecting the first set of connection lanes to a PCIe data storage device;

connecting the second set of connection lanes to a SAS data storage device; and determining, by one or more discovery processes at the one or more controllers, whether the signals are of a proper type.

10. The method of claim 9, wherein the one or more controllers comprises:
a PCIe controller;
wherein the PCIe controller controls the first set of connection lanes; and
a SAS controller;
wherein the SAS controller controls the second set of connection lanes.

11. The method of claim 9, wherein the one or more controllers comprises a combined SAS and PCIe storage controller.

12. The method of claim 11, wherein the combined SAS and PCIe storage controller comprises:
a processor;
a PCIe switch communicatively coupled to the processor;
wherein the PCIe switch controls the operation of the first set of connection lanes;
a SAS input/output controller communicatively coupled to the processor; and
a SAS expander communicatively coupled to the SAS input/output controller;
wherein the SAS expander controls the operation of the second set of connection lanes.

13. A method of selectively transferring data over a PCIe path or a SAS path comprising:
connecting an enhanced single connector having a first set of connection lanes and a second set of connection lanes connected to one or more controllers;
wherein the first set of connection lanes and the second set of connection lanes are provided by signals associated with at least one of a first set of signal pins, a second set of signal pins or a third set of signal pins of the enhanced single connector;
wherein the enhanced single connector is one of a SAS connector or a SATA connector;
wherein the one or more controllers control the connection lanes;
wherein the first set of connection lanes are operable as a PCIe signal path;
wherein the second set of connection lanes are optionally operable as a SAS signal path or a PCIe signal path;
connecting the first set of connection lanes to a PCIe data storage device;
connecting the second set of connection lanes to a data storage device selected from the group consisting of a SAS data storage device and a PCIe data storage device; and
determining, by one or more discovery processes at the one or more controllers, whether the signals are of a proper type.

14. The method of claim 13, wherein the first set of connection lanes is connected to a PCIe controller.

15. The method of claim 13, wherein the second set of connection lanes is connected to one of a PCIe controller and a SAS controller.

16. The method of claim 13, wherein the enhanced single connector is connected to a combined SAS and PCIe controller.

17. The method of claim 16, wherein the combined SAS and PCIe controller comprises:
a processor;
a PCIe switch communicatively coupled to the processor;
wherein the PCIe switch is operable to control the first set of connection lanes and the second set of connection lanes;
a SAS input/output controller communicatively coupled to the processor;
a SAS expander communicatively coupled to the SAS input/output controller;
wherein the SAS expander is operable to control the second set of connection lanes; and
a multiplexer connected to the PCIe switch and the SAS expander;
wherein the multiplexer determined which of the SAS expander and the PCIe switch controls the second set of connection lanes.

* * * * *